United States Patent
Liu et al.

(10) Patent No.: US 12,098,281 B2
(45) Date of Patent: Sep. 24, 2024

(54) DUAL CURABLE ORGANOPOLYSILOXANE COMPOSITION

(71) Applicant: DOW SILICONES CORPORATION, Midland, MI (US)

(72) Inventors: Junying Liu, Midland, MI (US); Xianghuai Wang, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 671 days.

(21) Appl. No.: 17/282,944

(22) PCT Filed: Oct. 4, 2019

(86) PCT No.: PCT/US2019/054620
§ 371 (c)(1),
(2) Date: Apr. 5, 2021

(87) PCT Pub. No.: WO2020/076620
PCT Pub. Date: Apr. 16, 2020

(65) Prior Publication Data
US 2021/0388208 A1 Dec. 16, 2021

Related U.S. Application Data

(60) Provisional application No. 62/742,617, filed on Oct. 8, 2018.

(51) Int. Cl.
| | | |
|---|---|---|
| C08F 2/46 | (2006.01) | |
| C08F 2/50 | (2006.01) | |
| C08G 61/04 | (2006.01) | |
| C08L 83/08 | (2006.01) | |
| C09D 183/08 | (2006.01) | |
| C09J 183/06 | (2006.01) | |

(52) U.S. Cl.
CPC ............ *C08L 83/08* (2013.01); *C09D 183/08* (2013.01); *C09J 183/06* (2013.01); *C08L 2205/035* (2013.01)

(58) Field of Classification Search
CPC .. C09D 183/08; C08K 5/5425; C08K 5/5419; C08K 5/0091; C08G 77/28; C08G 77/20; C08G 77/18; C08L 83/08; C08L 83/00; C08L 2205/035
USPC ............ 522/20, 12, 7, 6, 189, 184, 1; 520/1
See application file for complete search history.

(56) References Cited

U.S. PATENT DOCUMENTS

| | | | |
|---|---|---|---|
| 4,528,081 A | 7/1985 | Lien et al. | |
| 4,921,880 A | 5/1990 | Lee et al. | |
| 4,921,926 A | 5/1990 | Motegi et al. | |
| 4,952,711 A * | 8/1990 | Jacobine | C08L 83/06 522/40 |
| 5,696,209 A | 12/1997 | King et al. | |
| 2002/0192528 A1 | 12/2002 | Sixt et al. | |
| 2004/0209972 A1 | 10/2004 | Chambers et al. | |
| 2011/0319556 A1 | 12/2011 | Prenzel | |
| 2015/0376482 A1 | 12/2015 | Bekemeier et al. | |
| 2020/0207985 A1 | 7/2020 | Lim | |
| 2020/0283630 A1 | 9/2020 | Liu et al. | |

FOREIGN PATENT DOCUMENTS

| | | | |
|---|---|---|---|
| CN | 103459509 A | 12/2013 | |
| CN | 103992650 A | 8/2014 | |
| CN | 105518076 A | 4/2016 | |
| EP | 0409272 A1 | 1/1991 | |
| JP | H03128969 A | 5/1991 | |
| JP | 2020525577 A | 8/2020 | |
| JP | 2020529489 A | 10/2020 | |
| KR | 20150118140 A | 10/2015 | |
| WO | WO-2008088523 A1 * | 7/2008 | ............ C08G 77/14 |
| WO | 2012137854 A1 | 10/2012 | |
| WO | 2015030262 A1 | 3/2015 | |

OTHER PUBLICATIONS

International Search Report for PCT/US2019/054620 dated Jan. 31, 2020, 4 pages.
Machine assisted English translation of CN103992650A obtained from https://worldwide.espacenet.com/patent on Oct. 3, 2023, 11 pages.

* cited by examiner

*Primary Examiner* — Jessica Whiteley
(74) *Attorney, Agent, or Firm* — Warner Norcross + Judd LLP

(57) ABSTRACT

A dual curable organopolysiloxane composition is disclosed. The composition comprises: (A) a first organopolysiloxane having at least two mercapto (—SH) functional groups per molecule and free of an alkenyl group; (B) a second organopolysiloxane having at least one alkenyl group and at least one silicon atom-bonded alkoxy group per molecule; (C) optionally an organopolysiloxane having at least two alkenyl groups per molecule and free of silicon atom-bonded alkoxy group; (D) a photo-initiator; (E) a condensation catalyst; and (F) an epoxy functional compound. The composition has the ability to both photo-cure and cure through exposure to moisture, and exhibits good to excellent curability and long-term storage stability.

11 Claims, 2 Drawing Sheets

DUAL CURABLE ORGANOPOLYSILOXANE COMPOSITION

CROSS-REFERENCE TO RELATED APPLICATIONS

This application is the U.S. National Stage of International Application No. PCT/US2019/054620 filed on 4 Oct. 2019, which claims priority to and all advantages of U.S. Provisional Patent Application No. 62/742,617 filed on 8 Oct. 2018, the content of which is incorporated herein by reference.

TECHNICAL FIELD

The present invention relates to dual curable organopolysiloxane compositions which are capable of cross-linking when subjected to radiation in the ultraviolet ("UV") region of the electromagnetic spectrum, and subjected to moisture

BACKGROUND ART

Curable organopolysiloxane compositions exist in various forms and their characteristics may be modified to impart specific characteristics such as cure chemistry, viscosity, polymer type and purity. They can be formulated into one-part or two-part systems and a particular curable organopolysiloxane composition can be engineered to be cured by more than one mechanism. Moisture-curing mechanisms, heat-curing mechanisms, and photo-initiated curing mechanisms are among those mechanisms used to initiate cure, i.e., cross-linking of reactive organopolysiloxanes. These mechanisms are based on either condensation reactions, whereby moisture hydrolyzes certain groups on the siloxane backbone, or addition reactions which can be initiated by a form of energy, such as electromagnetic radiation or heat. For example, reactive organopolysiloxanes can be cured by heat in the presence of a peroxide, or they can be cured by heat in the presence of a silicon hydride-containing (SiH) compound and a metallic hydrosilylation catalyst, such as a platinum catalyst.

Typically, moisture curable organopolysiloxane compositions are manufactured by endcapping α,ω-silanol terminated organopolysiloxanes with various crosslinkers such as alkoxysilanes, oximinosilanes, acetoxysilanes, aminosilanes, and other silanes with hydrolyzable groups attached to the silicon atom(s) thereof. The resulting curable organopolysiloxane compositions are stored in moisture impermeable containers.

During application to a respective substrate, the curable organopolysiloxane compositions are extruded or otherwise applied and exposed to ambient conditions for curing. The moisture in the air then will hydrolyze the hydrolyzable groups (such as alkoxy, oximino, acetoxy, and amino) on the silicon atom(s) to form silanol, either with or without inclusion of a catalyst. The resulting silanol can then further react with remaining unhydrolyzed groups in a condensation reaction, to form a siloxane linkage resulting in the cure of the curable organopolysiloxane composition.

Although these materials when cured are very reliable and possess superior properties as coatings, the moisture cure tends to be slow. Cure times of 24 hours or more may often be needed before a full cure can be achieved. Such cure times limit through-put in the manufacture of coated components, since full cure of the coated components may be needed before the components can be used in the next step of the manufacture process.

As a result, a third curing mode, ultraviolet light curing, has gained wide acceptance in recent years. The curing is relatively fast, with the cured elastomer showing better adhesion to the substrates. In situations where portions of the coated material are shaded during the UV cure, a secondary cure mode, usually moisture cure can be further incorporated.

Typically, UV-curable organopolysiloxane compositions can be achieved by either a thiol-ene cure or by an acrylate cure. In the thiol-ene cure, a mercapto (—SH) functional organopolysiloxane is reacted with an alkenyl group-containing organopolysiloxane. The cure is fast and the surface dry to the touch upon the completion of the cure.

Dual curable organopolysiloxane compositions using UV light and moisture curing mechanisms are disclosed in Patent Document 1. This reference discloses compositions particularly useful for conformal coatings in electronic applications where the substrate has shadow areas which are not readily accessible to direct UV light and require moisture cure for cross-linking of those areas. Ordinarily, in addition to the photo-initiator present for radiation polymerization, a condensation catalyst such as an organotitanate or organotin is present. Without the condensation catalyst, moisture cure does not ordinarily take place with any degree of certainty or in any predictable time frame. Thus, as a practical matter, without the condensation catalyst, the moisture curing aspect of these compositions would not be practical for commercial use.

However, it has been reported that in commercial applications such dual curable organopolysiloxane composition is lack of long-term storage stability.

PRIOR ART DOCUMENTS

Patent Documents

Patent Document 1: U.S. Pat. No. 4,528,081

BRIEF SUMMARY OF INVENTION

Technical Problem

An object of the present invention is to provide a dual curable organopolysiloxane composition which has the ability to both photo-cure and cure through exposure to moisture, and which exhibits excellent curability and long-term storage stability.

Solution to Problem

The present invention provides the dual curable organopolysiloxane composition (the "composition") comprising:
 (A) a first organopolysiloxane having at least two mercapto functional groups per molecule and free of an alkenyl group;
 (B) a second organopolysiloxane having at least one alkenyl group and at least one silicon atom-bonded alkoxy group per molecule, in an amount such that the amount of the mercapto groups in component (A) is in the range of from about 0.1 to about 10 moles per 1 mole of the total alkenyl groups in components (B) and (C);
 (C) an organopolysiloxane having at least two alkenyl groups per molecule and free of a silicon atom-bonded alkoxy group, in an amount of from about 0 to about 80 mass % of the total mass of components (B) and (C);

(D) a photo-initiator in an amount of from about 0.01 to about 5 parts per 100 parts by mass of the total mass of components (A) to (F);
(E) a condensation catalyst in an amount of from about 0.01 to about 10 parts per 100 parts by mass of the total mass of components (A) to (F); and
(F) an epoxy functional compound in an amount of from about 0.01 to about 10 parts per 100 parts by mass of the total mass of components (A) to (F).

In various embodiments, component (A) is an organopolysiloxane comprising at least two siloxane units represented by the following general formula:

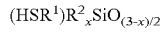

wherein $R^1$ represents a divalent hydrocarbon group with 1 to 8 carbons, $R^2$ represents an alkyl group, an aryl group, a hydrogen atom, a hydroxyl group or an alkoxy group; and "x" is 0, 1 or 2.

Component (A) may have the mercapto (—SH) groups in the range of from about 0.5 to about 15.0 mass %.

In various embodiments, component (B) is an organopolysiloxane produced by a hydrosilation reaction of (B-1) an organopolysiloxane having at least two alkenyl groups per molecule and (B-2) an organosilicon compound having one silicon atom-bonded hydrogen atom and at least one silicon atom-bonded alkoxy group per molecule.

In various embodiments, component (C) is 4,4'-bis(dimethylamino)benzophenone, diethoxyacetophenone, 2,2-dimethoxy-1,2-diphenylethan-1-one, 1-hydroxycyclohexyl-phenyl-ketone, 2-hydroxy-2-methyl-1-phenyl-propan-1-one, 2-methyl-1-[4-(methylthio)phenyl]-2-morpholinopropan-1-one, 1-[4-(2-hydroxyethoxy)phenyl]-2-hydroxy-2-methyl-propan-1-one, 2-benzyl-2-dimethylamino-1-(4-morpholinophenyl)butan-1-one, or bis(2,4,6-trimethylbenzoyl)phenylphosphine oxide, or combinations thereof.

In various embodiments, component (D) is an organometal catalyst selected from a group consisting of titanium compounds, zirconium compounds, and tin compounds.

In various embodiments, component (E) is an epoxy functional organosilicon compound. The epoxy functional silicon compound can be 3-glycidoxypropyl trimethoxysilane, 3-glycidoxypropyl methyldimethoxysilane, 3-glycidoxypropyl triethoxysilane, 2-(3,4-epoxycyclohexyl)ethyl trimethoxysilane, 2-(3,4-epoxycyclohexyl)ethyl methyldimethoxysilane, 2-(3,4-epoxycyclohexyl)ethyl triethoxysilane, 5,6-epoxyhexyl trimethoxysilane, 5,6-epoxyhexyl triethoxysilane, or 8-glycidoxyoctyl trimethoxysilane, or combinations thereof.

In certain embodiments, the composition results from both a UV-radiation cure mechanism and a moisture cure mechanism.

In certain embodiments, the composition is for use as a potting (or a pottant), a coating, an adhesive, or an encapsulation.

Effects of Invention

The dual curable organopolysiloxane composition according to this disclosure generally has the ability to both photo-cure and cure through exposure to moisture, and exhibits good to excellent curability and long-term storage stability.

DETAILED DESCRIPTION OF THE INVENTION

Figure 1:
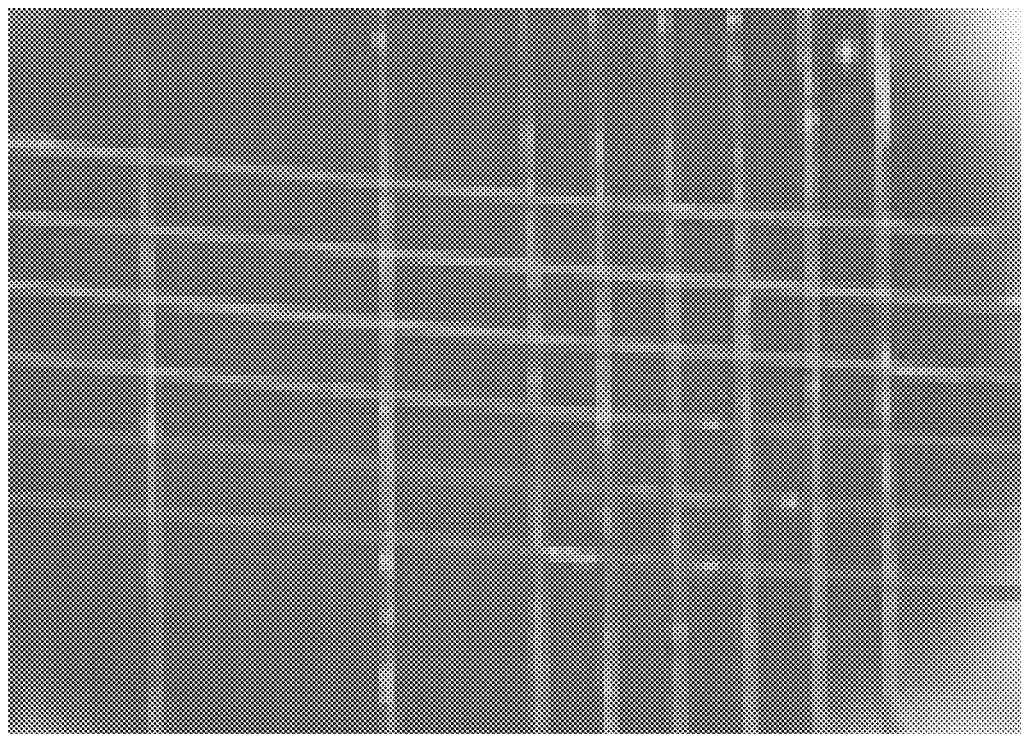
FIG. 1 is a photo of the cross-cut test result of Practical Example 1.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, the term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

<Dual Curable Organopolysiloxane Composition>

Component (A) is an organopolysiloxane having at least two mercapto (—SH) functional groups per molecule. Examples of the mercapto functional groups include mercaptoalkyl groups such as 3-mercaptopropyl groups, 4-mercaptobutyl groups, and 6-mercaptohexyl groups. Furthermore, examples of groups other than mercapto functional groups that are bonded to the silicon atom in component (A) include: alkyl groups with 1 to 12 carbons such as methyl groups, ethyl groups, propyl groups, butyl groups, pentyl groups, hexyl groups, heptyl groups, octyl groups, nonyl groups, decyl groups, undecyl groups, dodecyl groups, and the like; aryl groups with 6 to 12 carbons such as phenyl groups, tolyl groups, xylyl groups, and the like; aralkyl groups with 7 to 12 carbons such as benzyl groups, phenetyl groups, and the like; halogen substituted alkyl groups with 1 to 12 carbons such as 3-chloropropyl groups, 3,3,3-trifluoropropyl groups, and the like. In certain embodiments, from the perspective of economics and heat resistance, methyl groups are present. Furthermore, the silicon atom in component (B) may be bonded to a small amount of hydrogen atoms, hydroxyl groups or alkoxy groups such as methoxy groups, ethoxy groups, n-propoxy groups, i-propoxy groups, n-butoxy groups, sec-butoxy groups, tert-butoxy groups and the like.

In various embodiments, component (A) is an organopolysiloxane comprising at least two siloxane units of the following general formula:

$$(HSR^1)R^2_xSiO_{(3-x)/2}$$

In the formula, $R^1$ represents a divalent hydrocarbon group. Examples of the divalent hydrocarbon groups include: alkylene groups with 1 to 8 carbons such as methylene groups, ethylene groups, propylene groups, butylene groups, pentylene groups, hexylene groups, heptylene groups, and octylene groups. In certain embodiments, from the perspective of economics and heat resistance, propylene groups are present.

In the formula, $R^2$ represents an alkyl group, an aryl group, a hydrogen atom, a hydroxyl group or an alkoxy group. Examples of $R^2$ include: alkyl groups with 1 to 12 carbons such as methyl groups, ethyl groups, propyl groups, butyl groups, pentyl groups, hexyl groups, heptyl groups, octyl groups, nonyl groups, decyl groups, undecyl groups, dodecyl groups, and the like; aryl groups with 6 to 12 carbons such as phenyl groups, tolyl groups, xylyl groups, and the like; alkoxy groups with 1 to 6 carbons such as methoxy groups, ethoxy groups, propoxy groups, and the like. In certain embodiments, from the perspective of economics and heat resistance, methyl groups are present.

In the formula, "x" is 0, 1 or 2. When "x" is 0, the siloxane unit is a T unit represented by the following general formula:

$$HSR^1SiO_{3/2}.$$

When "x" is 1, the siloxane unit is a D unit represented by the following general formula:

$$(HSR^1)R^2SiO_{2/2}.$$

When "x" is 2, the siloxane unit is an M unit represented by the following general formula:

$$(HSR^1)R^2_2SiO_{1/2}.$$

Such component (A) may have mercapto (—SH) groups in the range of from about 0.5 to about 15.0 mass %, optionally of from about 0.5 to about 10.0 mass %, optionally of from about 1.0 to about 15.0 mass %, optionally of from about 1.0 to about 10.0 mass %, optionally of from about 1.0 to about 5.0 mass %, or optionally of from about 1.0 to about 4.0 mass %, of the component. This is because, if the content is above the lower limit of the range, curablity of the composition obtained will be enhanced; however, on the other hand, if the content is below the upper limit of the aforementioned range, heat resistance of the cured product obtained will be enhanced.

Component (B) is an organopolysiloxane having at least one alkenyl group and at least one silicon atom-bonded alkoxy group per molecule. Examples of the alkenyl group include vinyl groups, allyl groups, butenyl groups, pentenyl groups, hexenyl groups, heptenyl groups, octenyl groups, nonenyl groups, decenyl groups, undecenyl groups, and dodecenyl groups. In certain embodiments, from the perspective of economics and reactivity, at least one of vinyl groups, allyl groups, hexenyl groups, and octenyl groups are present. In particular, in view of the excellent curablility of the composition by UV light, component (B) may have at least two alkenyl groups per molecule.

Examples of the alkoxy group include methoxy groups, ethoxy groups, propoxy groups, and butoxy groups. In certain embodiments, from the perspective of economics and curability, at least one of methoxy groups and ethoxy groups are present. In particular, in view of the excellent curablility of the composition by moisture, component (B) may have at least two silicon atom-bonded alkoxy groups per molecule.

Furthermore, examples of groups other than alkenyl groups and alkoxy groups that are bonded to the silicon atom in component (B) include: alkyl groups with 1 to 12 carbons such as methyl groups, ethyl groups, propyl groups, butyl groups, pentyl groups, hexyl groups, heptyl groups, octyl groups, nonyl groups, decyl groups, undecyl groups, dodecyl groups, and the like; aryl groups with 6 to 12 carbons such as phenyl groups, tolyl groups, xylyl groups, and the like; aralkyl groups with 7 to 12 carbons such as benzyl groups, phenetyl groups, and the like; halogen substituted alkyl groups with 1 to 12 carbons such as 3-chloropropyl groups, 3,3,3-trifluoropropyl groups, and the like. In certain embodiments, from the perspective of economics and heat resistance, methyl groups are present.

Component (B) may be produced by a hydrosilation reaction of (B-1) an organopolysiloxane having at least two alkenyl groups per molecule and (B-2) an organosilicon compound having one silicon atom-bonded hydrogen atom and at least one silicon atom-bonded alkoxy group per molecule.

Raw material (B-1) is an organopolysiloxane having at least two alkenyl groups per molecule. Examples of the alkenyl group include vinyl groups, allyl groups, butenyl groups, pentenyl groups, hexenyl groups, heptenyl groups, octenyl groups, nonenyl groups, decenyl groups, undecenyl groups, and dodecenyl groups. In certain embodiments, from the perspective of economics and reactivity, at least one of vinyl groups, allyl groups, hexenyl groups, and octenyl groups are present.

Examples of groups other than alkenyl groups that are bonded to the silicon atom in raw material (B-1) include: alkyl groups with 1 to 12 carbons such as methyl groups, ethyl groups, propyl groups, butyl groups, pentyl groups, hexyl groups, heptyl groups, octyl groups, nonyl groups, decyl groups, undecyl groups, dodecyl groups, and the like; aryl groups with 6 to 12 carbons such as phenyl groups, tolyl groups, xylyl groups, and the like; aralkyl groups with 7 to 12 carbons such as benzyl groups, phenetyl groups, and the like; halogen substituted alkyl groups with 1 to 12 carbons such as 3-chloropropyl groups, 3,3,3-trifluoropropyl groups, and the like. In certain embodiments, from the perspective of economics and heat resistance, at least one of methyl groups and phenyl groups are present.

Raw material (B-2) is an organosilicon compound having one silicon atom-bonded hydrogen atom and at least one silicon atom-bonded alkoxy group per molecule. Examples of the alkoxy group include alkoxy groups with 1 to 6 carbons such as methoxy groups, ethoxy groups, propoxy groups, and butoxy groups. In certain embodiments, methoxy groups are present. In various embodiments, raw material (B-2) is an organosilicon compound having a trialkoxysilyl group or a dialkoxysilyl group.

Examples of raw material (B-2) include the following compounds. Note that, in the formulas, "Me" and "Et" respectively indicate a methyl group and an ethyl group.

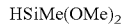

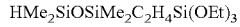

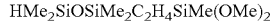

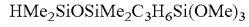

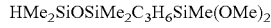

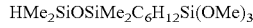

The added amount of raw material (B-2) is not limited, but in various embodiments it is in an amount such that the amount of the silicon atom-bonded hydrogen atoms in raw material (B-2) is from 0.1 to 0.9 mol, optionally from 0.2 to 0.8 mol, or optionally from 0.3 to 0.7 mol, per 1 mol of the alkenyl groups in raw material (B-1). This is because, when the added amount of component (B-2) is within the range described above, an organopolysiloxane that practically has at least one alkenyl group and at least one silicon atom-bonded alkoxy group per molecule can be obtained.

The hydrosilation reaction is enhanced by heating in the presence of a hydrosilation catalyst. Examples of the hydrosilation catalyst include platinum-based catalysts such as chloroplatinic acid, alcohol solutions of chloroplatinic acid, olefin complexes of platinum, alkenylsiloxane complexes of platinum, platinum black, and platinum-supported silica.

The content of component (B) in the composition is such that the amount of the mercapto (—SH) groups in component (A) is in the range of from about 0.1 to about 10 moles, optionally of from about 0.5 to about 5 moles, or optionally of from about 0.5 to about 1.5 moles, per 1 mole of the alkenyl groups in component (B) and (C). This is because if the amount of component (B) is within the aforementioned range, it will lead to sufficient cure to provide good mechanical properties.

Component (C) is an arbitrary or optional component, and is an organopolysiloxane having at least two alkenyl groups per molecule and free of a silicon atom-bonded alkoxy group. Examples of the alkenyl group include vinyl groups, allyl groups, butenyl groups, pentenyl groups, hexenyl groups, heptenyl groups, octenyl groups, nonenyl groups, decenyl groups, undecenyl groups, and dodecenyl groups. In certain embodiments, from the perspective of economics and reactivity, at least one of vinyl groups, allyl groups, hexenyl groups, and octenyl groups are present.

Examples of groups other than alkenyl groups that are bonded to the silicon atom in component (C) include: alkyl groups with 1 to 12 carbons such as methyl groups, ethyl groups, propyl groups, butyl groups, pentyl groups, hexyl groups, heptyl groups, octyl groups, nonyl groups, decyl groups, undecyl groups, dodecyl groups, and the like; aryl groups with 6 to 12 carbons such as phenyl groups, tolyl groups, xylyl groups, and the like; aralkyl groups with 7 to 12 carbons such as benzyl groups, phenetyl groups, and the like; halogen substituted alkyl groups with 1 to 12 carbons such as 3-chloropropyl groups, 3,3,3-trifluoropropyl groups, and the like. In certain embodiments, from the perspective of economics and heat resistance, methyl groups are present.

In certain embodiments, component (C) is present in an amount of from about in an amount of from about 0 to about 80 mass %, optionally of from about 10 to about 80 mass %, optionally of from about 20 to about 80 mass %, optionally of from 30 to about 80 mass %, or optionally of from about 40 to about 80 mass %, of the total mass of components (B) and (C). This is because if the amount of component (C) is within the aforementioned range, it will lead to sufficient cure to provide good mechanical properties.

Component (D) is a photo-initiator to enhance photo-cure of the composition. Component (D) may be selected from any known free radical type photo-initiator effective for promoting crosslinking reactions. Examples of component (D) include diethoxyacetophenone (DEAP), benzoin methyl ether, benzoin ethyl ether, benzoin isopropyl ether, diethoxyxanthone, chloro-thioxanthone, azo-bisisobutyronitrile, N-methyl diethanolaminebenzophenone 4,4'-bis(dimethylamino)benzophenone, diethoxyacetophenone, 2,2-dimethoxy-1,2-diphenylethan-1-one, 1-hydroxycyclohexyl-phenyl-ketone, 2-hydroxy-2-methyl-1-phenylpropan-1-one, 2-methyl-1-[4-(methylthio)phenyl]-2-morpholinopropan-1-one, 1-[4-(2-hydroxyethoxy)phenyl]-2-hydroxy-2-methyl-propan-1-one, 2-benzyl-2-dimethylamino-1-(4-morpholino-phenyl)butan-1-one, bis(2,4,6-trimethylbenzoyl) phenylphosphine oxide, and combinations thereof.

The content of component (D) is in effective amount for photo-cure. In various embodiments, component (D) is present in an amount of from about 0.01 to about 5 parts by mass, optionally of from about 0.1 to about 5 parts by mass, or optionally of from about 0.1 to about 3 parts by mass, per 100 parts by the total mass of components (A) to (F). This is because if the amount of component (D) is above the lower limit of the range, the composition obtained will sufficiently cure by UV light; however, if, on the other hand, the amount is below the upper limit of the aforementioned range, the mechanical properties of the cured product obtained will be enhanced.

Component (E) is a condensation catalyst to enhance moisture cure of the composition. Examples of component (E) include organo-metal catalysts including titanium compounds such as tetra(isopropoxy)titanium, tetra(n-butoxy) titanium, tetra(t-butoxy)titanium, di(isopropoxy)bis(ethylacetoacetate)titanium, di(isopropoxy)bis(methylacetoacetate)titanium, di(isopropoxy)bis(acetylacetonate)titanium, and the like; zirconium compounds such as tetra(isopropoxy)zirconium, tetra(n-butoxy)zirconium, tetra(t-butoxy)zirconium, di(isopropoxy)bis(ethylacetoacetate)zirconium, di(isopropoxy)bis(methylacetoacetate)zirconium, di(isopropoxy)bis(acetylacetonate) zirconium, and the like; tin compounds such as dimethyltin dineodecanoate, dibutyltin dilaurate, dibutyltin dioctoates, and the like; and stannous octoate, and the like.

The content of component (E) is in effective amount for moisture cure. In various embodiments, component (E) is present in an amount of from about 0.01 to about 10 parts by mass, optionally of from about 0.05 to about 10 parts by mass, or optionally of from about 0.05 to about 5 parts by mass, per 100 parts by the total mass of components (A) to (F). This is because if the amount of component (E) is above the lower limit of the range, the composition obtained will sufficiently cure by moisture; and if the amount is below the upper limit of the aforementioned range, surface cure rate of the resulting composition is improved.

Component (F) is an epoxy functional compound to enhance long-term stability of the composition. Examples of component (F) include epoxy functional organosilicon compounds such as 3-glycidoxypropyl trimethoxysilane, 3-glycidoxypropyl triethoxysilane, 3-glycidoxypropyl methyldimethoxysilane, 2-(3,4-epoxycyclohexyl)ethyl trimethoxysilane, 2-(3,4-epoxycyclohexyl)ethyl methyldimethoxysilane, 3,4-epoxybutyl trimethoxysilane, 3,4-epoxybutyl methyldimethoxysilane, 5,6-epoxyhexyl trimethoxysilane, 5,6-epoxyhexyl triethoxysilane, 8-glycidoxyoctyl trimethoxysilane, and the like; and epoxy functional non-silicon compounds such as methyl glycidyl ether, glycidyl methacrylate, and the like. In certain embodiments, from the perspective of adhesive properties, at least one of the epoxy functional organosilicon compounds is present.

The content of component (F) is in effective amount for long term storage stability. In various embodiments, component (F) is present in an amount of from about 0.01 to about 10 parts by mass, optionally of from about 0.05 to about 10 parts by mass, or optionally of from about 0.05 to about 5 parts by mass, per 100 parts by mass of the sum of components (A) to (F). This is because if the amount of component (F) is above the lower limit of the range, the composition obtained will have sufficient long term storage stability; and if the amount is below the upper limit of the aforementioned range, mechanical properties of the cured product obtained will be enhanced.

The composition may also contain one or more other additives so long as they do not interfere with the curing mechanisms. For example, conventional additives such as fillers, adhesion promoters, resins, pigments, moisture scavengers, fluorescent dye, inhibitors and the like may be included.

Fillers such as fumed silica or quartz are contemplated. Fillers may be present in amounts up to about 30 mass %, such as from about 4 to about 20 mass % of the total mass of components (A) to (F).

Inhibitors may be present in amounts up to about 5% by weight, such as from about 0.001 to about 1 mass % of the total mass of components (A) to (F). The particular amount of inhibitor should be balanced in a given composition to produce or improve stability of the composition. Such amounts can be determined via routine experimentation.

Adhesion promoters may be present in amounts up to about 5 mass %, such as from about 0.5 mass % of the total mass of components (A) to (F).

The composition may be prepared by mixing together the respective components to obtain a substantially homogenous or uniformly blended material and stored in containers which are non-transmissive to UV light and moisture. Generally, a single package system is utilized, but two-part package systems may be used if desired. Whereas single package products are ready-for-use upon being dispersed, two-part systems generally require mixing of the dispersed parts prior to use.

The composition may be used as noted above in potting applications and coatings, encapsulations, gels for a variety of substrates including electronic parts and other heat-sensitive materials.

Useful UV radiation sources include conventional mercury-vapor lamps designed to emit ultraviolet energy in various ultraviolet wavelength bands, LED curing lamps, etc. For example, useful radiation wavelength ranges include 200 to 400 nm.

UV cure is generally effected in the range of 40 milliwatts/cm$^2$ ("mW/cm$^2$") to about 300 mW/cm$^2$, such as in the range of about 70 mW/cm$^2$ to about 300 mW/cm$^2$.

EXAMPLES

The dual curable organopolysiloxane composition of the present invention will now be described in detail using Practical Examples and Comparative Examples. Note that, in the formulas, "Me," "Vi," and "Thi" respectively indicate a methyl group, a vinyl group, and a 3-mercaptopropyl group. The characteristics of the dual curable organopolysiloxane composition and the cured product thereof were measured as follows.

<Viscosity>

Viscosities for all dual curable organopolysiloxane compositions were measured using a Brookfield cone and plate viscometer (model HBDVII+P) with the cone spindle CP-40.

Viscosity of the organopolysiloxanes were measured using a Brookfield DV1 viscometer according to ASTM D 1084 at 23±2° C.

<OMe, SH, and C=C Peak Areas>

IR and Raman spectroscopies are applied to analyze —OMe, —SH, and C=C peaks to understand the cure chemistry. 2841 cm$^{-1}$ peak in IR is the characteristic band for —OMe; 2582 cm$^{-1}$ in Raman spectra is the characteristic of —SH group which is normalized to the overtone of the Si-Me deformation band located at 2498 cm$^{-1}$; 1597 cm$^{-1}$ peak in Raman spectra is the characteristic band of C=C peak.

The dual curable organopolysiloxane compositions were examined by IR spectroscopy using a single bounce Attenuated Total Reflectance attachment equipped with a diamond crystal. The depth of penetration during the surface analysis was estimated to be 2 microns near 1000 cm$^{-1}$. The IR spectrum was collected with a Thermo Scientific Nicolet 6700 FTIR spectrometer using 64 scans at 4 cm$^{-1}$ resolution.

The dual curable organopolysiloxane compositions were examined by Raman spectroscopy using a Raman microprobe spectrometer (Thermofisher DXR) equipped with a 532 nm diode laser and a 10× objective lens. The Raman spectra were collected with total 300 seconds scans (1 s×300 accumulations) at 2 cm$^{-1}$ resolution and 10.0 mW laser power.

<Dual Curability>

Dual curable organopolysiloxane compositions were subjected to ultraviolet irradiation using A Colight UV-6 with mercury lamp at UV intensity of 300 mW/cm$^2$ and a dosage of 2 J/cm$^2$. After the irradiation, the UV exposure area were cured to tack free. The shadow areas are cured and become tack-free after 24 to 48 hours cure at 22° C./42% RH.

<Shore A Hardness>

Hardness of the cured product as mentioned above was measured by a Shore A durometer (CV-71200 from INST & MFG Co).

Reference Example 1

In a 2 L Atlas batch reactor, 638.1 grams of a dimethylpolysiloxane capped with dimethylvinylsiloxy groups at the molecular terminals (average M.W.=8,000; vinyl content=1.2 mass %) was mixed with the 40.5 grams of HMe$_2$SiOSiMe$_2$C$_2$H$_4$Si(OMe)$_3$. The mixture was agitated for 10 minutes at 350 rpm, and then 10 ppm of Pt catalyst was added into the mixture. The reaction mixture agitated at room temperature under nitrogen for 3 hours. The infrared spectrum of the sample showed a complete loss of SiH peak at 2110 cm$^{-1}$, indicating the completion of the hydrosilation reaction. Part of the vinyl group on the siloxane converted to moisture curable trimethoxysilyl containing functionality. This trimethoxysilyl- and vinyl-functional dimethylpolysiloxane practically has at least one vinyl group and at least one trimethoxysilyl group per molecule, and the content of vinyl groups is 0.6 mass % and the content of trimethoxysilyl groups is 0.8 mass %.

Practical Example 1

A dual curable organopolysiloxane composition was prepared by blending together 16.8 parts by mass of a dimethylsiloxane·methyl(3-mercaptopropyl)siloxane copolymer having 3.5 mass % of SH groups and a viscosity of 80 mPa·s; 19.0 parts by mass of an organopolysiloxane consisting of Me$_2$ViSiO$_{1/2}$, Me$_2$SiO$_{2/2}$ and SiO$_{4/2}$, and having 1.2 mass % of vinyl groups and a viscosity of 120 mPa·s; 26.0 parts by mass of a dimethylpolysiloxane capped with dimethylvinylsiloxy groups at both molecular terminals, and having 0.45 mass % of vinyl groups; 22.7 parts by mass of a trimethoxysilyl- and vinyl-functional dimethylpolysiloxane obtained by Reference Example 1; and 12.2 parts by mass of hexamethyldisilazane treated fumed silica in a 100 mL dental cup. The mixture was mixed at 1000 rpm for 20 seconds, and then mixed at 2000 rpm for 30 seconds. Premixed 1 part by mass of methyl trimethoxysilane; 0.05 parts by mass of butylated hydroxytoluene; and 0.5 parts by mass of 3-glycidoxypropyl trimethoxysilane were added. The mixture was mixed at 2000 rpm for 30 seconds. Finally, 0.3 parts by mass of 2-hydroxy-2-methyl-1-phenyl-propan-1-one and 0.15 parts by mass of di-isopropoxytitanium bis(ethylacetoacetate) were added; and the composition was mixed at 2000 rpm for 30 seconds. The sample was then packaged in 30 mL syringe and deaerated; and then vacuum sealed in an aluminum bag.

Practical Example 2

A dual curable organopolysiloxane composition was prepared as described in Practical Example 1 except that 1.0 part by mass of 3-glycidoxypropyl trimethoxysilane was added.

Practical Example 3

A dual curable organopolysiloxane composition was prepared as described in Practical Example 1 except that 2.0 parts by mass of 3-glycidoxypropyl trimethoxysilane was added.

Comparative Example 1

For comparative purpose, a dual curable organopolysiloxane composition was prepared as described in Practical Example 1 except that 3-glycidoxypropyl trimethoxysilane was not added.

These dual curable organopolysiloxane compositions in Practical Examples 1 to 3 and Comparative Example 1 were subjected to an accelerated aging test at 50° C. for 21 days. The viscosity of the composition was measured before and after aging and the results are shown in Table 1. The OMe, SH, and C═C peak areas before and after aging are also shown in Table 1.

TABLE 1

| | | | Category | | | |
|---|---|---|---|---|---|---|
| | | Item | Practical Example 1 | Practical Example 2 | Practical Example 3 | Comparative Example 1 |
| | Viscosity at 25° C. (mPa · s) | Before aging | 514 | 540 | 534 | 507 |
| | | After aging | 740 | 745 | 890 | Gelled during aging (>500,000) |
| Before aging | Dual Curability | UV exposure area 2 J/cm$^2$ UV irradiation | Cured | Cured | Cured | Cured |
| | | Shadow area 48 hrs. at R.T. | Cured | Cured | Cured | Cured |
| | Cured Product | Shore A hardness | 31 | 31 | 31 | 31 |

TABLE 1-continued

| | Item | | Practical Example 1 | Practical Example 2 | Practical Example 3 | Comparative Example 1 |
|---|---|---|---|---|---|---|
| After aging | Dual Curability | UV exposure area 2 J/cm$^2$ UV irradiation | Cured | Cured | Cured | N/A |
| | | Shadow area 48 hrs. at R.T. | Cured | Cured | Cured | N/A |
| | Cured Product | Shore A hardness | 31 | 31 | 31 | N/A |
| Raman and IR data (Peak area) | OMe | Before aging | 0.016 | 0.018 | N/A | 0.014 |
| | | After aging | 0.010 | 0.011 | N/A | 0.0083 |
| | SH | Before aging | 1.15 | 1.17 | N/A | 1.15 |
| | | After aging | 1.11 | 1.11 | N/A | 0.74 |
| | C=C | Before aging | 0.47 | 0.48 | N/A | 0.48 |
| | | After aging | 0.44 | 0.46 | N/A | 0.36 |

<Adhesion of the Cured Product>

The dual curable organopolysiloxane compositions in Practical Examples 1 to 3 and Comparative Example 1 were evaluated by means of a cross-cut test. Coatings were made by drawing down 8 mils of aged formulation on FR4 boards, followed by 2 J/cm$^2$ UV exposure, and room temperature ("R.T.") cure for 5 days. The cross-cut test results are shown in Table 2.

TABLE 2

Figure 2:
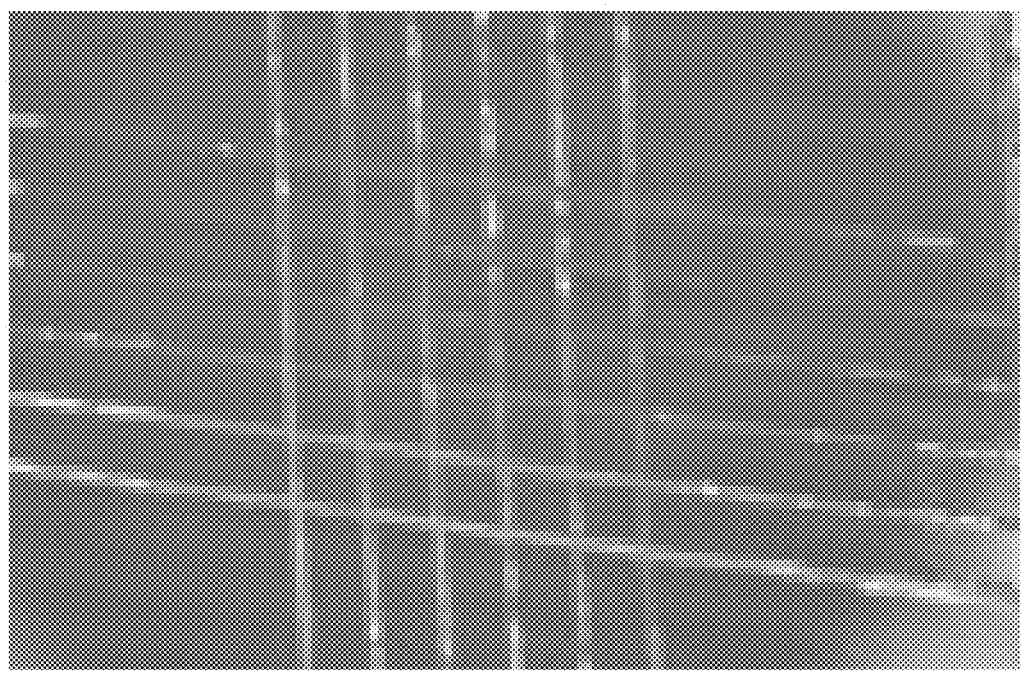
FIG. 2 is a photo of the cross-cut test result of Practical Example 2.
Figure 3:
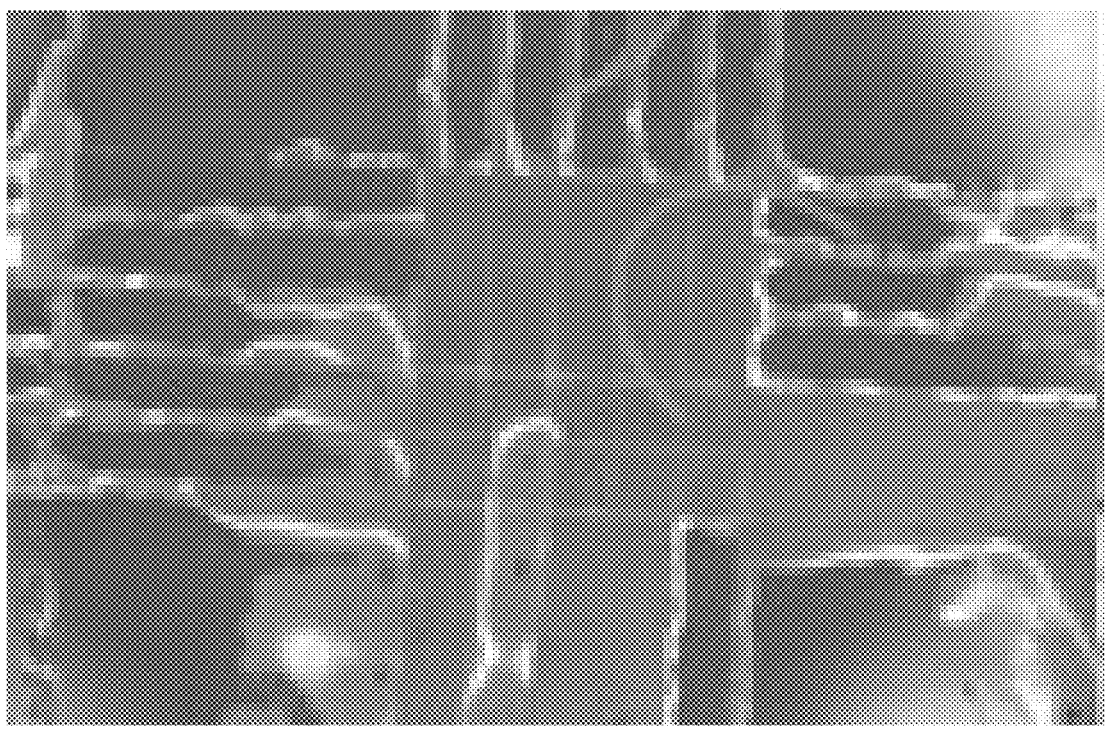
FIG. 3 is a photo of the cross-cut test result of Comparative Example 1.

| | Category | | |
|---|---|---|---|
| Item | Practical Example 1 | Practical Example 2 | Comparative Example 1 |
| Appearance | See FIG. 1 | See FIG. 2 | See FIG. 3 |

Results clearly show that 3-glycidoxypropyl trimethoxysilane dramatically improved the shelf-life of the thiol-ene UV and moisture dual cure compositions. In addition, the cross-cut test in Table 2 shows 3-glycidoxypropyl trimethoxysilane also dramatically improved the composition adhesions.

Practical Example 4

A dual curable organopolysiloxane composition was prepared by blending together 16.8 parts by mass of a random copolymer of dimethylsiloxane and methyl(3-mercaptopropyl)siloxane having 3.5 mass % of SH groups and a viscosity of 80 mPa·s; 19 parts by mass of an organopolysiloxane consisting of Me$_2$ViSiO$_{1/2}$, Me$_2$SiO$_{2/2}$ and SiO$_{4/2}$, and having 1.2 mass % of vinyl groups and a viscosity of 120 mPa·s; 26.4 parts by mass of a dimethylpolysiloxane capped with dimethylvinylsiloxy groups at both molecular terminals, and having 0.45 mass % of vinyl groups; 26.3 parts by mass of a trimethoxysily- and vinyl-functional dimethylpolysiloxane obtained by Reference Example 1; and 12.2 parts by mass of hexamethyldisilazane treated fumed silica in a 100 mL dental cup. The mixture was mixed at 1000 rpm for 20 seconds, and then mixed at 2000 rpm for 30 seconds. Premixed 0.3 parts by mass of 1-hydroxycyclohexyl-phenyl-ketone; 0.85 parts by mass of methyl trimethoxysilane; and 0.05 parts by mass of butylated hydroxytoluene, 0.5 parts by mass of 3-glycidoxypropyl trimethoxysilane were added. The mixture was mixed at 2000 rpm for 30 seconds. Finally, 0.12 parts by mass of di-isopropoxytitanium bis(ethylacetoacetate) was added in a dental mixer; and the blend was mixed at 2000 rpm for 30 seconds. The sample was then packaged in 30 mL syringe and deaerated; and then vacuum sealed in an aluminum bag.

Comparative Example 2

For comparative purpose, a dual curable organopolysiloxane composition was prepared as described in Practical Example 4 except that 3-glycidoxypropyl trimethoxysilane was not added.

Comparative Example 3

A dual curable organopolysiloxane composition was prepared by blending together 18.4 parts by mass of a random copolymer of dimethylsiloxane and methyl(3-mercaptopropyl)siloxane having 3.5 mass % of SH groups and a viscosity of 80 mPa·s; 19.0 parts by mass of an organopolysiloxane consisting of Me$_2$ViSiO$_{1/2}$, Me$_2$SiO$_{2/2}$ and SiO$_{4/2}$, and having 1.2 mass % of vinyl groups and a viscosity of 120 mPa·s; 26.1 parts by mass of a dimethylpolysiloxane capped with dimethylvinylsiloxy groups at both molecular terminals, and having 0.45 mass % of vinyl groups; 26.1 parts by mass of a trimethoxysilyl- and vinyl-functional dimethylpolysiloxane obtained by Reference Example 1; and 12.2 parts by mass of hexamethyldisilazane treated fumed silica in a 100 mL dental cup. The mixture was mixed at 1000 rpm for 20 seconds, and then mixed at 2000 rpm for 30 seconds. Premixed 0.3 parts by mass of 1-hydroxycyclohexyl-phenyl-ketone; 0.85 parts by mass of methyl trimethoxysilane; 0.05 parts by mass of butylated hydroxytoluene, and 0.5 parts by mass of 3-methacryloxypropyl trimethoxysilane were added; the mixture was mixed at 2000 rpm for 30 seconds. Finally, 0.12 parts by mass of di-isopropoxytitanium bis (ethylacetoacetate) were added; and the composition was mixed at 2000 rpm for 30 seconds. The sample was then packaged in 30 mL syringe and deaerated; and then vacuum sealed in an aluminum bag. These dual curable organopolysiloxane compositions in Comparative Examples 2 and 3 were subjected to room temperature aging for 30 days followed by an accelerated aging test at 50° C. for 14 days. The viscosity of the composition was measured before and after aging and the results are shown in Table 3. The OMe, SH, and C=C peak areas before and after aging are also shown in Table 3.

TABLE 3

|  | Item |  | Practical Example 4 | Comparative Example 2 | Comparative Example 3 |
|---|---|---|---|---|---|
| Viscosity at 25° C. (mPa·s) |  | Before aging | 460 | 460 | 452 |
|  |  | After aging | 587 | 1683 | Gelled during aging |
| Before aging | Dual Curability | UV exposure area 2 J/cm² UV irradiation | Cured | Cured | Cured |
|  |  | Shadow area 48 hrs. at R.T. | Cured | Cured | Cured |
|  | Cured Product | Shore A hardness | 30 | 30 | 30 |
| After aging | Dual Curability | UV exposure area 2 J/cm² UV irradiation | Cured | Cured | N/A |
|  |  | Shadow area 48 hrs. at R.T. | Cured | Slightly tacky | N/A |
|  | Cured Product | Shore A hardness | 30 | 28 | N/A |
| Raman and IR data (Peak area) | OMe | Before aging | 0.016 | 0.014 | 0.016 |
|  |  | After aging | 0.0089 | 0.0075 | 0.0053 |
|  | SH | Before aging | 1.18 | 1.17 | 1.19 |
|  |  | After aging | 1.18 | 0.66 | 0.95 |
|  | C=C | Before aging | 0.48 | 0.47 | 0.47 |
|  |  | After aging | 0.49 | 0.33 | 0.40 |

Results show that the addition of 3-methacryloxypropyl trimethoxysilane lowered the storage stability of the formulation.

Practical Example 5

A dual curable organopolysiloxane composition was prepared by blending together 16.8 parts by mass of a random copolymer of dimethylsiloxane and methyl(3-mercaptopropyl)siloxane having 3.5 mass % of SH groups and a viscosity of 80 mPa·s; 19.0 parts by mass of an organopolysiloxane consisting of $Me_2ViSiO_{1/2}$, $Me_2SiO_{2/2}$ and $SiO_{4/2}$, and having 1.2 mass % of vinyl groups and a viscosity of 120 mPa·s; 26.0 parts by mass of a dimethylpolysiloxane capped with dimethylvinylsiloxy groups at both molecular terminals, and having 0.45 mass % of vinyl groups; 22.7 parts by mass of a trimethoxysilyl- and vinyl-functional dimethylpolysiloxane obtained by Reference Example 1; and 12.2 parts by mass of hexamethyldisilazane treated fumed silica in a 100 mL dental cup. The mixture was mixed at 1000 rpm for 20 seconds, and then mixed at 2000 rpm for 30 seconds. Premixed 2 part by mass of methyl trimethoxysilane; 0.15 parts by mass of butylated hydroxytoluene; and 0.5 parts by mass of 2-(3,4-epoxycyclohexyl)ethyl trimethoxysilane were added. The mixture was mixed at 2000 rpm for 30 seconds. Finally, 0.3 parts by mass of 2-hydroxy-2-methyl-1-phenyl-propan-1-one and 0.15 parts by mass of di-iso-propoxytitanium bis(ethylacetoacetate) were added; and the composition was mixed at 2000 rpm for 30 seconds. The sample was then packaged in 30 ml syringe and deaerated; and then vacuum sealed in an aluminum bag.

Comparative Example 4

For comparative purpose, a dual curable organopolysiloxane composition was prepared as described in Practical Example 5 except without 2-(3,4-epoxycyclohexyl)ethyl trimethoxysilane. The dual curable organopolysiloxane compositions in Practical Example 5 and Comparative Example 4 were subjected to an accelerated aging test at 55° C. for 28 days. The viscosity of the composition was measured before and after aging and the results are shown in Table 4. The OMe, SH, and C=C peak areas before and after aging are also shown in Table 4.

TABLE 4

|  | Item |  | Practical Example 5 | Comparative Example 4 |
|---|---|---|---|---|
| Viscosity at 25° C. (mPa·s) |  | Before aging | 405 | 400 |
|  |  | After aging | 1250 | 18670 |
| Before aging | Dual Curability | UV exposure area 2 J/cm² UV irradiation | Cured | Cured |
|  |  | Shadow area 48 hrs. at R.T. | Cured | Cured |
|  | Cured Product | Shore A hardness | 30 | 30 |
| After aging | Dual Curability | UV exposure area 2 J/cm² UV irradiation | Cured | Cured |
|  |  | Shadow area 48 hrs. at R.T. | Cured | Slightly tacky |
|  | Cured Product | Shore A hardness | 30 | 28 |
| Raman and IR data (Peak area) | OMe | Before aging | 0.16 | 0.14 |
|  |  | After aging | 0.010 | 0.006 |
|  | SH | Before aging | 1.15 | 1.15 |
|  |  | After aging | 1.0 | 0.93 |
|  | C=C | Before aging | 0.47 | 0.47 |
|  |  | After aging | 0.43 | 0.41 |

The results show the addition of 2-(3,4-epoxycyclohexyl) ethyl trimethoxysilane improved the shelf-life of the formulation.

INDUSTRIAL APPLICABILITY

The dual curable organopolysiloxane composition of this disclosure is advantageously used as a conformal coating of an electric/electronic apparatus, because it cures at room temperature subjected to UV radiation and by contact with moisture in air and forms a cured product that exhibits good

What is claimed is:

1. A dual curable organopolysiloxane composition, the composition comprising:
   (A) a first organopolysiloxane having at least two mercapto functional groups per molecule and free of an alkenyl group;
   (B) a second organopolysiloxane having at least one alkenyl group and at least one silicon atom-bonded alkoxy group per molecule, in an amount such that the amount of the mercapto groups in component (A) is in the range of from about 0.1 to about 10 moles per 1 mole of the total alkenyl groups in components (B) and (C);
   (C) an organopolysiloxane having two alkenyl groups per molecule and free of a silicon atom-bonded alkoxy group, in an amount of from about 10 to about 80 mass % of the total mass of components (B) and (C);
   (D) a photo-initiator in an amount of from about 0.01 to about 5 parts per 100 parts by mass of the total mass of components (A) to (F);
   (E) a condensation catalyst in an amount of from about 0.01 to about 10 parts per 100 parts by mass of the total mass of components (A) to (F); and
   (F) an epoxy functional compound in an amount of from about 0.01 to about 10 parts per 100 parts by mass of the total mass of components (A) to (F).

2. The composition according to claim 1, wherein component (A) is an organopolysiloxane comprising at least two siloxane units represented by the following general formula:

$(HSR^1)R^2_xSiO_{(3-x)/2}$ wherein $R^1$ represents a divalent hydrocarbon group with 1 to 8 carbons, $R^2$ represents an alkyl group, an aryl group, a hydrogen atom, a hydroxyl group or an alkoxy group; and x is 0, 1 or 2.

3. The composition according to claim 1, wherein component (A) has the mercapto groups in the range of from about 0.5 to about 15.0 mass %.

4. The composition according to claim 1, wherein component (B) is an organopolysiloxane produced by a hydrosilation reaction of (B-1) an organopolysiloxane having at least two alkenyl groups per molecule and (B-2) an organosilicon compound having one silicon atom-bonded hydrogen atom and at least one silicon atom-bonded alkoxy group per molecule.

5. The composition according to claim 1, wherein component (D) is selected from the group consisting of 4,4'-bis(dimethylamino)benzophenone, diethoxyacetophenone, 2,2-dimethoxy-1,2-diphenylethan-1-one, 1-hydroxycyclohexyl-phenyl-ketone, 2-hydroxy-2-methyl-1-phenyl-propan-1-one, 2-methyl-1-[4-(methylthio)phenyl]-2-morpholinopropan-1-one, 1-[4-(2-hydroxyethoxy)phenyl]-2-hydroxy-2-methyl-propan-1-one, 2-benzyl-2-dimethylamino-1-(4-morpholinophenyl)butan-1-one, bis(2,4,6-trimethylbenzoyl)phenylphosphine oxide, and combinations thereof.

6. The composition according to claim 1, wherein component (E) is an organo-metal catalyst selected from the group consisting of titanium compounds, zirconium compounds, and tin compounds.

7. The composition according to claim 1, wherein component (F) is an epoxy functional organosilicon compound.

8. The composition according to claim 7, wherein the epoxy functional silicon compound is selected from the group consisting of 3-glycidoxypropyl trimethoxysilane, 3-glycidoxypropyl methyldimethoxysilane, 3-glycidoxypropyl triethoxysilane, 2-(3,4-epoxycyclohexyl)ethyl trimethoxysilane, 2-(3,4-epoxycyclohexyl)ethyl methyldimethoxysilane, 2-(3,4-epoxycyclohexyl)ethyl triethoxysilane, 5,6-epoxyhexyl trimethoxysilane, 5,6-epoxyhexyl triethoxysilane, 8-glycidoxyoctyl trimethoxysilane, and combinations thereof.

9. The composition according to claim 1, wherein the composition can cure from both a UV-radiation cure mechanism and a moisture cure mechanism.

10. A reaction product of a reaction of the composition according to claim 9.

11. A potting, a coating, an adhesive or an encapsulation formed from the composition according to claim 1.

* * * * *